US011034532B2

(12) United States Patent
Wehner et al.

(10) Patent No.: US 11,034,532 B2
(45) Date of Patent: Jun. 15, 2021

(54) PICKING DEVICE FOR PICKING FROM A STORAGE CONTAINER INTO AN ORDER CONTAINER, AND CORRESPONDING METHOD

(71) Applicant: Dematic GmbH, Heusenstamm (DE)

(72) Inventors: Matthias Wehner, Offenbach (DE); Hartwig Reckemeier, Rodgau (DE); Tobias Polanz, Görgeshausen (DE); Armin Jung, Mühlheim (DE); Sören Mushack, Erzhausen (DE)

(73) Assignee: Dematic GmbH, Heusenstamm (DE)

(*) Notice: Subject to any disclaimer, the term of this patent is extended or adjusted under 35 U.S.C. 154(b) by 3 days.

(21) Appl. No.: 16/400,832

(22) Filed: May 1, 2019

(65) Prior Publication Data

US 2019/0337733 A1 Nov. 7, 2019

(30) Foreign Application Priority Data

May 2, 2018 (DE) .......................... 102018110502.9

(51) Int. Cl.
*B65G 47/90* (2006.01)
*B65G 1/04* (2006.01)
*B25J 15/04* (2006.01)
*B25J 5/00* (2006.01)
*B25J 9/16* (2006.01)

(52) U.S. Cl.
CPC ............. *B65G 47/90* (2013.01); *B25J 5/007* (2013.01); *B25J 9/1697* (2013.01); *B25J 15/04* (2013.01); *B65G 1/0421* (2013.01); *B65G 1/0492* (2013.01)

(58) Field of Classification Search
CPC ...................................................... B65G 47/90
See application file for complete search history.

(56) References Cited

U.S. PATENT DOCUMENTS

| 4,678,390 A | 7/1987 | Bonneton et al. | |
| 5,211,523 A * | 5/1993 | Andrada Galan | ........ B60L 3/04 |
| | | | 414/282 |

(Continued)

FOREIGN PATENT DOCUMENTS

| CA | 2793834 C | 11/2017 |
| DE | 102014111886 A1 | 2/2016 |

(Continued)

OTHER PUBLICATIONS

Dematic Multishuttle with Piece Picking Robot, video at https://www.youtube.com/watch?v=kVuq-_5I95M, Posted May 2, 2017.

(Continued)

*Primary Examiner* — Ronald P Jarrett
(74) *Attorney, Agent, or Firm* — Gardner, Linn, Burkhart & Ondersma LLP

(57) ABSTRACT

A picking device and method for increasing the through-put of picking an order from a storage container into an order container. The picking device includes a mobile platform capable to travel along a guide rail and a robotic gripping arm. The mobile platform includes a receiving location for each of a storage container and an order container, which are both reachable by the robotic gripping arm. The robotic gripping arm is actuated by a platform-supported image acquisition and evaluation unit and by a platform-supported controller.

14 Claims, 4 Drawing Sheets

(56) References Cited

U.S. PATENT DOCUMENTS

| | | | |
|---|---|---|---|
| 5,303,788 A * | 4/1994 | Muselli | B25J 5/007 |
| | | | 180/21 |
| 5,379,229 A * | 1/1995 | Parsons | B65G 1/1378 |
| | | | 414/273 |
| 5,380,139 A * | 1/1995 | Pohjonen | B65G 1/0435 |
| | | | 414/273 |
| 5,733,098 A | 3/1998 | Lyon et al. | |
| 5,934,864 A | 8/1999 | Lyon et al. | |
| 7,261,509 B2 | 8/2007 | Freudelsperger | |
| 7,682,122 B2 * | 3/2010 | Maynard | B65G 1/1375 |
| | | | 414/276 |
| 8,666,536 B2 | 3/2014 | Freudelsperger | |
| 8,965,560 B2 | 2/2015 | Mathi et al. | |
| 9,327,397 B1 * | 5/2016 | Williams | B25J 3/00 |
| 9,452,894 B2 * | 9/2016 | Puchwein | B25J 9/1612 |
| 9,550,624 B2 | 1/2017 | Khodl et al. | |
| 9,592,759 B1 | 3/2017 | Theobald | B25J 13/089 |
| 9,760,086 B2 | 9/2017 | Woodtli et al. | |
| 9,815,155 B2 * | 11/2017 | Lin | B25J 9/0018 |
| 10,214,354 B2 * | 2/2019 | Toebes | G06Q 10/087 |
| 10,252,862 B2 | 4/2019 | Mathi et al. | |
| 10,280,001 B2 * | 5/2019 | Oki | B65G 1/0407 |
| 10,343,881 B2 * | 7/2019 | Guo | B25J 5/007 |
| 10,589,417 B2 * | 3/2020 | Bastian, II | B25J 5/02 |
| 2014/0234066 A1 | 8/2014 | Mathi et al. | |
| 2017/0036343 A1 * | 2/2017 | Sturm | B25J 11/0075 |
| 2017/0107055 A1 | 4/2017 | Magens et al. | |
| 2017/0174431 A1 * | 6/2017 | Borders | B65G 67/02 |
| 2018/0057263 A1 | 3/2018 | Beer | |
| 2018/0065806 A1 | 3/2018 | Sugahara et al. | |
| 2018/0122177 A1 | 5/2018 | Este et al. | |

FOREIGN PATENT DOCUMENTS

| | | |
|---|---|---|
| DE | 102015220091 A1 | 4/2017 |
| DE | 102016008078 A1 | 1/2018 |
| DE | 102017002363 A1 | 9/2018 |
| DE | 102017112658 A1 | 12/2018 |
| EP | 0235488 A1 | 9/1987 |
| EP | 3022134 B1 | 3/2017 |
| EP | 3459880 A1 | 3/2019 |
| WO | 2011006598 A1 | 1/2011 |
| WO | 2011032654 A1 | 3/2011 |
| WO | 2018090081 A1 | 5/2018 |

OTHER PUBLICATIONS

FlexTruck AGV with Robotic Case Pick, video at https://www.youtube.com/watch?v=yn5ejzbrj_s, Posted May 2, 2017.

Knapp AG—Pick-it-Easy Robot, video at https://www.youtube.com/watch?v=E_MH51IzUsE, Posted Sep. 1, 2014.

Swisslog & KUKA: Automated Item Picking (AIP), video at https://www.youtube.com/watch?v=MJSITiLi7iA, Posted May 22, 2015.

"Knapp's picking robot named Best Product at LogiMAT 2017", by Knapp's Intralogistics Magazine, published Mar. 2017.

"Fast & Accurate: Self-Learning Robotic Application for Reliable Single Item Picking", by Swisslog Itempiq publication, publication date unknown.

"Knapp presents picking robot at LogiMAT 2017", by www.KNAPP.com, publication date unknown.

"Robotic Order Fulfillment", by Dematic, published Feb. 2018.

"Robotic Piece Picking Module", by Dematic, published May 2018.

* cited by examiner

PICKING DEVICE FOR PICKING FROM A STORAGE CONTAINER INTO AN ORDER CONTAINER, AND CORRESPONDING METHOD

RELATED APPLICATIONS

The present application claims priority from German Patent Application No. 102018110502.9 DE, filed on May 2, 2018, the entire contents of which are fully incorporated herein by reference.

FIELD OF THE INVENTION

The present invention relates to a picking device and a corresponding picking method for picking from a storage container into an order container.

BACKGROUND OF THE INVENTION

Shuttle systems conventionally operate according to the goods-to-person principle and include the operating steps of removal from storage, discharge, conveying, picking, introducing and placement into storage. The actual manual picking takes place outside the (high-level) rack store at a separate picking location (cf. e.g. EP 3 022 134 B1).

Alternatively, so-called robotic picking concepts have recently been published in which, for picking purposes, robots detect, grasp and transfer unit loads. This takes place at dedicated picking locations, e.g. the Knapp Pick-it-Easy Robot System (https://www.youtube.com/watch?v=E_MH51IzUsE), Swisslog Automated Item Picking (https://www.youtube.com/watch?v=MJSITiLi7iA) or also Dematic RapidPick XT. In addition, the mobile implementation of such robot-assisted picking processes on AGVs or shuttles is also known (cf. Dematic Piece Picking Robot: https://www.youtube.com/watch?v=kVuq-_5I95M or Dematic FlexTruck AGV: https://www.youtube.com/watch?v=yn5ejzbrj_s), for which reason these comprise a robotic gripping arm which enables them to exploit a certain freedom of movement at the dedicated picking locations or along travel paths and areas.

SUMMARY OF THE INVENTION

The present invention provides a picking system and method having improved performance operating within a compact installation space.

In accordance with the present invention, it has been recognized that when a picking device for picking from a storage container into an order container includes a mobile platform which can travel along a guide rail and has a robotic gripping arm, where the mobile platform includes a receiving location for each of the storage container and the order container, which are both disposed to be reachable by the robotic gripping arm, and the robotic gripping arm is actuated by a platform-supported image acquisition and evaluation unit and by a platform-supported controller, i.e. picking takes place using the robot directly on the mobile platform, time-consuming removal from storage and relocation of the storage container can be dispensed with, which in turn increases the through-put of the system. Furthermore, there are no requirements for the delivery of source and target containers in a specific order/sequence. In other words, operation is conducted according to a robot-to-goods principle. The goods containers or storage containers are used for picking exactly where they are stored. Thus they do not have to be conveyed e.g. within the store from the rack to the picking station and back.

With this principle, the complete picking process (e.g. within the rack store) can be carried out autonomously and therefore the number of operating steps, and the time required therefor, can be reduced. Furthermore, the manual effort/employment of staff for picking is totally eliminated. Thus, for picking purposes, the storage containers are removed from storage onto the mobile platform only briefly and are used for picking at that location. The storage containers are then placed directly back into storage.

In contrast, the order container is carried along until the picking order for the respective mobile platform is completed. Only when the corresponding picking order is ended will the container be discharged from the mobile platform, which is then free for the next picking order. The discharged order container can be "further processed" by a wide variety of processes and techniques. For example, it can leave the rack store via lifts, for which purpose it can be discharged onto these lifts directly or indirectly via buffer sections. The lifts can be disposed at end faces of the rack and/or within the rack, e.g. centrally within the storage locations in the aisle longitudinal direction, in a so-called drive-through configuration. Direct discharge onto conveyors for removal from storage or onto other rack serving apparatuses—e.g. another aisle or another level of the store—is also feasible.

Order containers are understood to be collecting containers into which articles of an order can be picked. This may be a matter of a partial order, i.e. of some of the articles required to completely fulfil the order, so that the corresponding container receives all its picked articles later when all articles are present or in other areas (zones), or is consolidated with other partial order containers. Storage containers are understood to be source containers, from which articles are removed and transferred into order containers. The source containers can contain articles of one kind (single-type) or mixed articles of various kinds.

In a particular embodiment, the picking device is a picking and rack store system having a rack store with storage racks which, on rack levels lying one above another, comprise storage locations for goods containers, at least of a rack aisle extending between storage racks disposed next to one another, and the mobile platform is a rack serving apparatus which can travel at least along the rack aisle, for placing the goods containers into storage and removing them from storage into or out of the storage locations of the storage racks by means of a load pick-up device or load picking-up means. However, it will be understood that use in a picking station in the pre-zone etc. is possible and so the conveying paths for the storage containers are short.

In an expedient manner, the receiving locations for goods containers are disposed next to one another and the robotic gripping arm is disposed there between. This makes it possible to optimally exploit the reaching range of the robotic gripping arm. The robotic gripping arm is preferably a multi-axis gripping arm, e.g. a 6-axis arm. The camera of the platform-supported image acquisition and evaluation unit may be elevated so that it has an optimal viewing angle and field of vision of the storage container.

The elevating systems can, like the robotic gripping arm, be expandable or movable so that the level height in a rack store with single-level rack serving apparatuses does not have to be raised at each level in order to permit travel there over. The receiving locations can comprise the same or different conveying technology to accept and discharge the goods containers. In other words, the receiving location for the order container can be designed with simple roller, band or belt conveyor technology, whereas it is practical to design the receiving location for the storage container with telescopic rails and fingers which can be extended and retracted in order to permit the containers to be placed into storage and removed from storage into/out of the storage rack.

The robotic gripping arm in a particular embodiment has an exchangeable gripping head so that, depending on the article to be gripped, a suitable gripping head can be used as required, e.g. finger/clamping grippers, vacuum grippers, etc. The mobile platform can correspondingly comprise locations for stowing replacement gripping heads. Therefore, automatic exchange is possible directly on the mobile platform and in reference to the next picking order. The mobile platform can be a rack serving apparatus, a single-level rack serving apparatus, in particular a shuttle, or even a conventional rack serving apparatus, which comprises a running gear unit which can travel along the aisle and has a mast and a lifting carriage, which can travel vertically on the mast, as a load pick-up device load picking-up means. When the mobile platform is a single-level rack serving apparatus, a single-level rack serving apparatus can be disposed at each level (storage rack). Alternatively, a single-level rack serving apparatus lift can be provided in order to change rack levels.

In accordance with the present invention, a method for picking from a storage container into an order container is also provided, wherein the storage container and the order container are located on a mobile platform which can travel along a guide rail and has a robotic gripping arm, wherein the mobile platform comprises a receiving location for each of the storage container and the order container, which can both be reached by the robotic gripping arm, and the robotic gripping arm is actuated by a platform-supported image acquisition and evaluation unit and a platform-supported controller in order to pick from the storage container into the order container.

In accordance with an aspect of the invention, picking takes placed directly after storage container removal in the rack aisle when it is carried out in a rack store in which goods containers are stored in opposing storage racks on a plurality of levels, where there is a rack aisle between the storage racks, and the mobile platform is a rack serving apparatus, and where the rack serving apparatus comprises a load pick-up device with the two receiving locations for storage containers and order containers.

As a further feature, order processing is carried out in a fully autonomous manner by the mobile platform, i.e. by transfer of a picking order from a central order controller to the controller of the rack serving apparatus, which then processes the order automatically, for which purpose the image acquisition and evaluation unit operates with object detection in order to detect the object of the order in the removed storage container on the load pick-up device or load picking-up means and to control the robotic gripping arm accordingly for pick-up and discharge into the order container on the load pick-up device. In other words, the mobile platform communicates only the (half) order per se (e.g. article, quantity, storage site) to the central order controller. All processing steps are then carried out by the mobile platform automatically/in a self-contained manner, i.e. e.g. approach to the storage location, removal of the storage container from storage, image acquisition and article detection and actuation of the robotic gripping arm, etc., placement of the storage container into storage and approach to the next storage location etc. until the order is complete and the order container is discharged.

In addition, the articles in the storage container can be verified by means of a bar code reader and possibly additional data (e.g. batch number, MHD etc.) can be determined. This prevents just any source container from having to be moved, as hitherto, from the rack to a picking location or picking robot outside the rack. At the same time, this is a quality control instrument.

Further details of the invention will become clear from the following description of exemplified embodiments by reference to the drawings.

DESCRIPTION OF PREFERRED EMBODIMENTS

Figure 1:
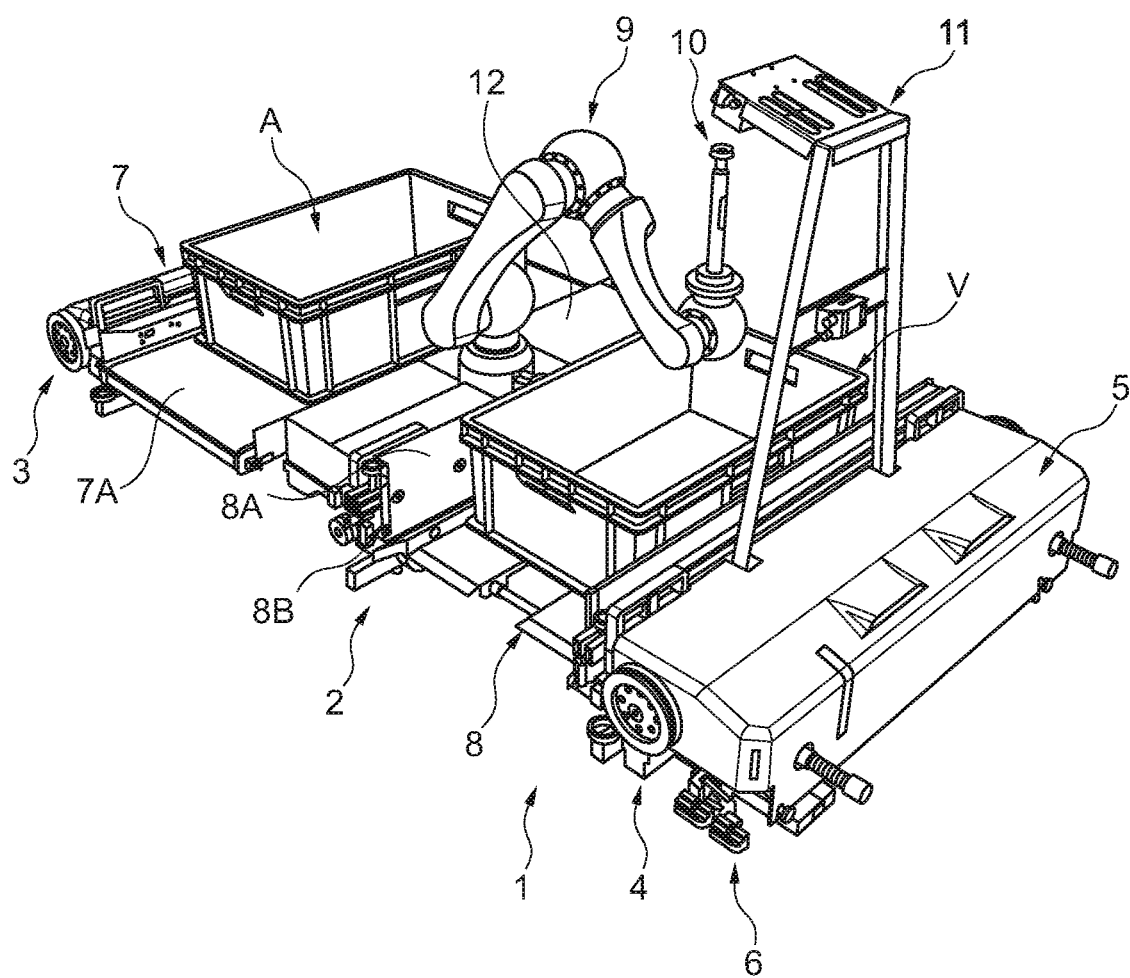
FIG. 1 is a schematic perspective view of a single-level rack serving apparatus.

FIG. 1 illustrates a single-level rack serving apparatus designated as a whole by 1 and also known as a shuttle. It comprises a mobile platform 2 which can travel on rails and comprises axles at the front and rear in the direction of travel with running rollers 3 and driven rollers 4.

In the region of the driving rollers 4, a control unit 5 is also disposed, which is supplied with power (in a known manner from the running rail, not shown) via conductor line contact shoes 6 and controls the shuttle 1. The shuttle 1 has two mutually spaced receiving locations 7, 8. One receiving location 7 is for an order container A which is to be carried along and the other receiving location 8 is for a storage container V to be placed into storage and removed from storage.

The receiving location 7 is designed with a conveying system configured as a belt conveyor 7A for receiving and discharging the order container A. In contrast, the receiving location 8 for the storage container V is designed with a conveying system comprising telescopic rails 8A disposed on both sides, including fingers 8B which can be extended and retracted so that the storage containers V can be placed into storage and removed from storage on both sides in a known manner. Between these locations, a 6-axis robotic gripping arm 9 together with a gripping head 10 is disposed so that, for picking purposes, it can transfer articles from the respectively loaded storage container V into the order container A which is carried along.

In the region of the control unit 5, an elevated CCD optical imager or camera arrangement 11 is disposed so that it can acquire images of the respectively loaded storage container V, which images are evaluated in the control unit 5 for object detection in order to control the 6-axis robotic gripping arm 9 together with the gripping head 10 to pick up the necessary article. The imager 11 and control unit 5 may thus comprise an image acquisition and evaluation unit or assembly. The robotic gripping arm 9 is actuated by the image acquisition and evaluation unit and by a platform-supported controller 5a (FIG. 3) in order to pick from the storage container V into the order container A. The control unit 5 can likewise additionally communicate in a known manner with a central order controller via the conductor line contact shoes 6 in order to obtain information relating to the picking order per se which is to be processed, such as article, quantity, storage site. However, the actual order processing itself, including the image detection, is carried out automatically in the control unit 5. The gripping head 10 of the robotic gripping arm 9 is exchangeable, for which purpose a stowing station 12 is disposed on the shuttle 1 next to the base of the robotic gripping arm 9, and so the robotic gripping arm 9 can independently exchange the gripping head 10 in order to use a suitable gripping head 10 depending on the article to be picked.

Figure 2:
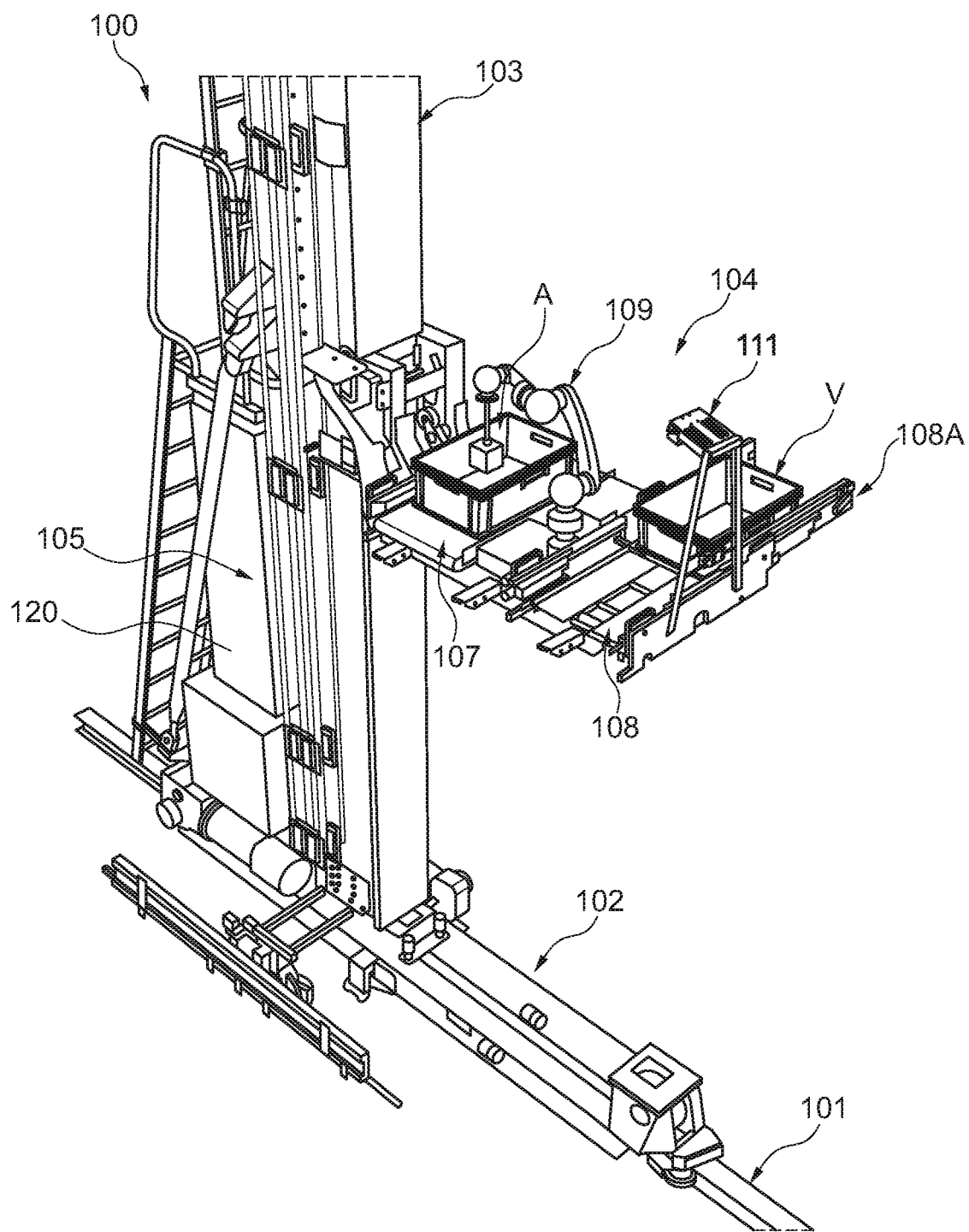
FIG. 2 is a schematic perspective view of a rack serving apparatus with a mast and lifting carriage.

FIG. 2 shows a rack serving apparatus 100 which comprises a running gear unit 102, which can travel along a rail 101 and has a mast 103, and a lifting carriage 104, which can travel vertically on the mast 103, as a load pick-up device or load picking-up means. In comparison to the shuttle of FIG. 1, the rack serving apparatus 100 is a multi-level rack serving apparatus since it can approach all positions and levels of a storage rack. Otherwise, however, the lifting carriage 104 is equipped with the same technology (receiving locations, robotic gripping arm, CCD optical arrangement etc.) as the shuttle of FIG. 1. Accordingly, the corresponding parts are provided with reference signs increased by 100. In the present case, only the control unit 105 is not disposed on the lifting carriage 104 itself but in the central electronic housing 120 at the mast base since electronic means and controllers are mounted at that location in any case.

Figure 3:
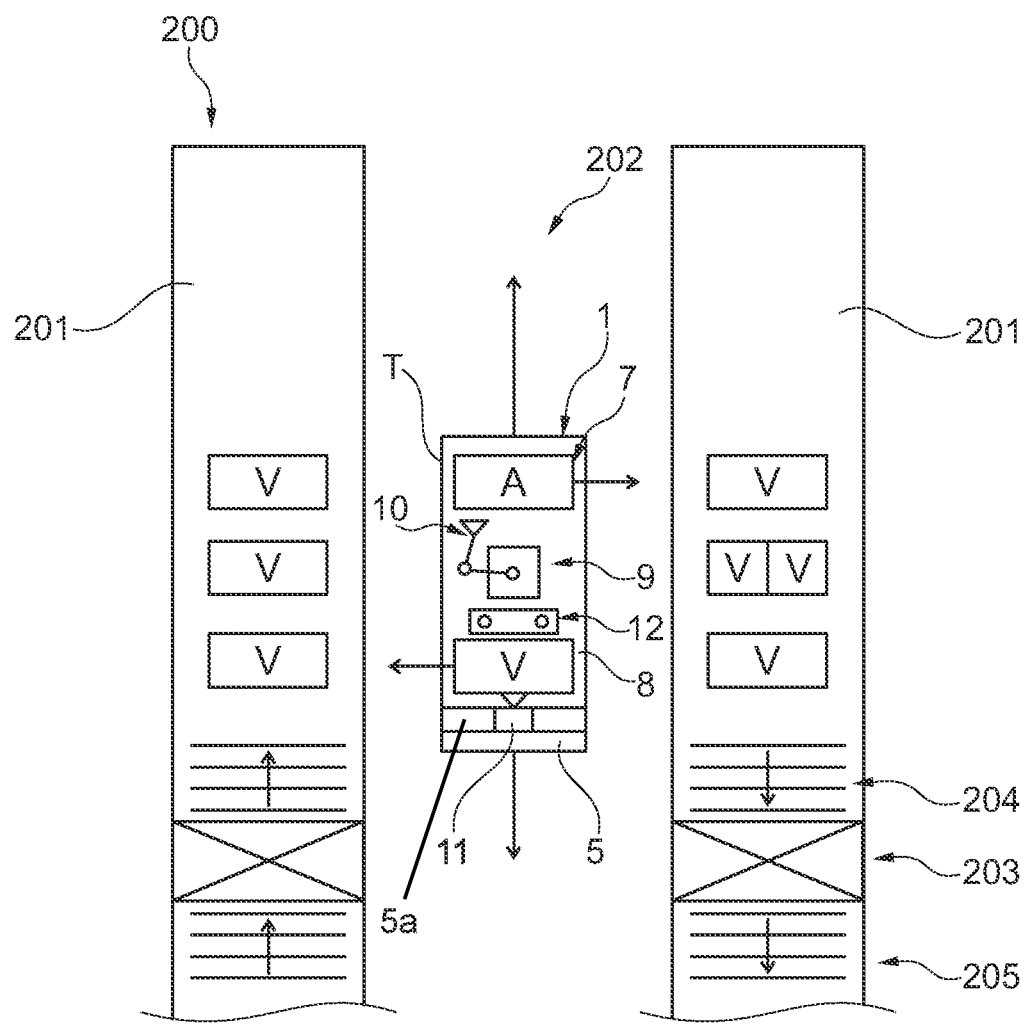
FIG. 3 is a schematic plan view of a rack store system using the single-level rack serving apparatus as shown in FIG. 1 for picking purposes.
Figure 4:
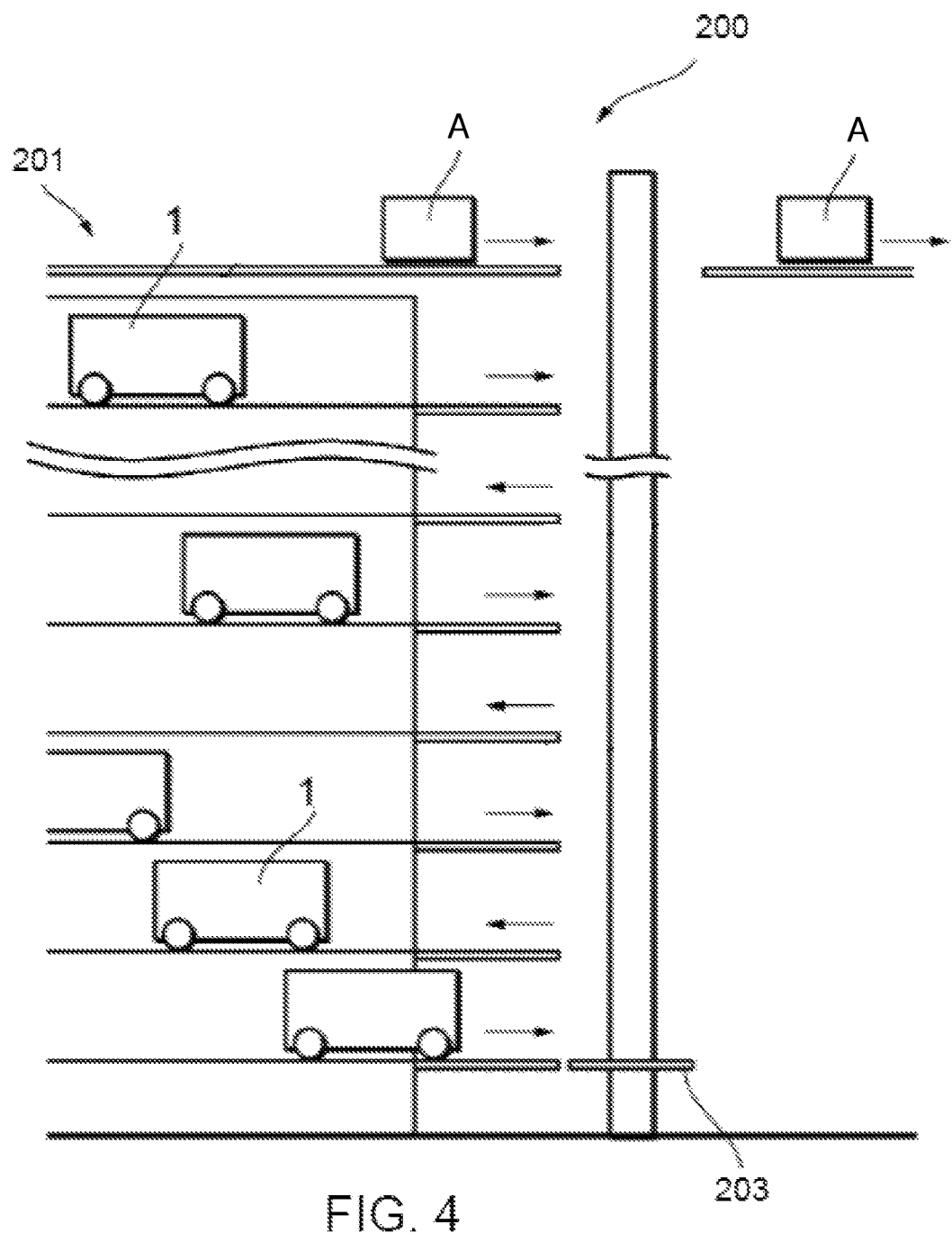
FIG. 4 is a side elevation view of the rack store system of FIG. 3, shown with one of a plurality of single-level rack serving apparatuses disposed at various rack levels of the rack store system.

FIGS. 3 and 4 illustrate the use of a single-level rack serving apparatus (or shuttle) 1 and a plurality of single-level rack serving apparatuses 1, respectively, as shown in FIG. 1 for picking purposes in a rack store system 200. The rack store system 200 comprises multi-level storage racks 201 which are separated from one another by a rack aisle 202 (FIG. 3) and comprise storage locations for storage containers V. The shuttle 1 travels at each level in the rack aisle 202, as described above in relation to FIG. 1. Vertical lifts 203 are integrated in each of the storage racks 201 and are provided on both sides with buffers for removal from storage and placement into storage 204, 205 in order to decouple the container discharge for removal from storage or the container reception for placement into storage by means of the shuttle from the lift operation.

The shuttle 1 or the control unit 5 thereof receives a picking order. In order to fulfil this picking order it receives an empty container as an order container A in the receiving location 7 and then travels along the rack aisle 202 to the storage location of a storage container V which is required first. Having arrived at that location, it pulls the storage container V out of the storage rack 201 onto the receiving location 8 by means of the telescopic rails 8A and fingers 8B. The CCD optical imager arrangement 11 acquires an image of the content of the storage container V, which is subjected to an object detection process in the evaluation module of the control unit 5 in order to detect the position of the articles in the storage container V. In this way, it is now possible to control the robotic gripping arm 9 and the gripping head 10 thereof accordingly in order to pick up the article from the storage container V and discharge same into the order container A.

The storage container V is then immediately pushed from the receiving location 8 back into its storage location in the storage rack 201 by means of the telescopic rails 8A and fingers 8B. The process is repeated in an analogous manner for the next article or storage container V until the order has been processed. The order container A thus filled is then discharged via the buffer for removal from storage 204 onto the lift 203 for removal from storage. The shuttle 1 can then accept or process the next order.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A picking device for picking from a storage container into an order container comprising:
a mobile platform configured to travel along a guide rail and comprising a robotic gripping arm, an image acquisition and evaluation unit, a controller and receiving locations for each of a storage container and an order container, wherein the storage container and order container comprise goods containers, wherein the storage container and order container are both disposed to be reachable by the robotic gripping arm when disposed at the respective receiving locations, wherein the image acquisition and evaluation unit comprises an imager and a control unit, and wherein the robotic gripping arm is configured to be actuated by the image acquisition and evaluation unit and the controller supported on the mobile platform to transfer goods from a storage container to an order container when the storage container and order container are at the receiving locations, and wherein the robotic gripping arm comprises an exchangeable gripping head.

2. The picking device as claimed in claim 1, wherein the picking device comprises a picking and rack store system having a rack store with storage racks having rack levels positioned one above another, wherein the storage racks comprise storage locations for goods containers and at least one rack aisle extending between the storage racks disposed next to one another, and wherein the mobile platform is configured to travel at least along the at least one rack aisle for placing goods containers into or out of the storage locations of the storage racks.

3. The picking device as claimed in claim 1, wherein the robotic gripping arm is disposed between the receiving locations of the mobile platform.

4. The picking device as claimed in claim 2, wherein the mobile platform comprises a single-level mobile platform configured as a shuttle.

5. The picking device as claimed in claim 4, further comprising a plurality of single-level mobile platforms, and wherein one of the single-level mobile platforms is disposed at each rack level.

6. The picking device as claimed in claim 4, further comprising a lift, and wherein the single-level mobile platform is able to change rack levels by means of the lift.

7. The picking device as claimed claim 2, wherein the mobile platform is a rack serving apparatus and comprises a running gear unit configured to travel along the rack aisle, and wherein the running gear unit, includes a mast and a lifting carriage, wherein the lifting carriage is configured to travel vertically on the mast.

8. The picking device as claimed in claim 1, wherein the robotic gripping arm is disposed between the receiving locations of the mobile platform.

9. The picking device as claimed in claim 1, wherein the receiving locations of the mobile platform each comprise a conveying system to accept and discharge good containers into and out of the receiving locations, and wherein the conveying system of one of the receiving locations may he the same or than the conveying system of the other receiving location.

10. A method for picking from a storage container into an order container comprising:
locating a storage container and an order container on a mobile platform, wherein the mobile platform is configured to travel along a guide rail and includes a robotic gripping arm and a receiving location for each of the storage container and the order container, wherein the robotic gripping arm is configured to reach both the storage container and the order container; and
picking from the storage container into the order container by actuating the robotic gripping arm by an image acquisition and evaluation unit supported on the mobile platform, wherein the image acquisition and evaluation unit comprises an imager and a control unit and the control unit causes a gripping head of the robotic gripping arm to be exchanged directly on the mobile platform based on a detection of an object to be picked in accordance with an order.

11. The method as claimed in claim 10, wherein the picking from the storage container into the order container is carried out in a rack store with storage containers stored therein in opposing storage racks on a plurality of levels, wherein the rack store comprises a rack aisle disposed between the storage racks, and wherein the mobile platform is a rack serving apparatus, wherein the rack serving apparatus comprises receiving locations for storage containers and order containers and a conveying system for placing the goods containers into or out of the storage locations of the storage racks, and wherein the method further comprises removing a storage container from the rack aisle onto the rack serving apparatus with the picking from the storage container performed directly after the storage container is removed from the rack aisle.

12. The method as claimed in claim 11, wherein the imager and control unit includes object detection processing, and wherein the method further comprises:
transferring a picking order from a central order controller to the control unit supported on the mobile platform; and
processing the order automatically with the imager and control unit by detecting objects in the removed storage container on the receiving location for the removed storage container with the imager and control unit and controlling the robotic gripping arm for pick-up and discharge into the order container on the receiving location for the order container.

13. The method as claimed in claim 11, further comprising returning the storage container to one of the storage racks immediately after the step of picking of the order from the storage container into the order container.

14. The method as claimed in claim 10, wherein mobile platform further comprises a controller supported on the platform.

* * * * *

UNITED STATES PATENT AND TRADEMARK OFFICE
CERTIFICATE OF CORRECTION

PATENT NO. : 11,034,532 B2
APPLICATION NO. : 16/400832
DATED : June 15, 2021
INVENTOR(S) : Matthias Wehner et al.

It is certified that error appears in the above-identified patent and that said Letters Patent is hereby corrected as shown below:

In the Claims

Column 7
Line 2, Claim 9, "he" should be --be--
Line 3, Claim 9, insert --different-- after "or"

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*